(12) United States Patent
Banning et al.

(10) Patent No.: US 9,820,604 B2
(45) Date of Patent: Nov. 21, 2017

(54) BREWING FUNNEL SHIELD AND SENSOR

(71) Applicant: BUNN-O-MATIC CORPORATION, Springfield, IL (US)

(72) Inventors: Jason M. Banning, Springfield, IL (US); Jamie D. Ratterman, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 14/776,828

(22) PCT Filed: Mar. 14, 2014

(86) PCT No.: PCT/US2014/029339
§ 371 (c)(1),
(2) Date: Sep. 15, 2015

(87) PCT Pub. No.: WO2014/144784
PCT Pub. Date: Sep. 18, 2014

(65) Prior Publication Data
US 2016/0029830 A1    Feb. 4, 2016

Related U.S. Application Data

(60) Provisional application No. 61/787,466, filed on Mar. 15, 2013.

(51) Int. Cl.
*A47J 31/00* (2006.01)
*A47J 31/06* (2006.01)
(52) U.S. Cl.
CPC ........... *A47J 31/0626* (2013.01); *A47J 31/06* (2013.01)

(58) Field of Classification Search
CPC .............................. A47J 31/0626; A47J 31/06
USPC ......... 99/275, 279, 280, 282, 288, 293, 303, 99/304, 315, 323
See application file for complete search history.

(56) References Cited

U.S. PATENT DOCUMENTS

| | | | | |
|---|---|---|---|---|
| 5,910,205 | A | * | 6/1999 | Patel .................. A47J 31/0642 99/307 |
| 6,055,900 | A | | 5/2000 | Bunn |
| 7,182,017 | B1 | | 2/2007 | Knepler et al. |
| 2003/0000392 | A1 | * | 1/2003 | Lassota .................. A47J 31/58 99/279 |
| 2003/0213370 | A1 | | 11/2003 | Hammad et al. |
| 2004/0221724 | A1 | * | 11/2004 | Lowe .................. A47J 31/0605 99/299 |
| 2005/0132892 | A1 | * | 6/2005 | Hall ..................... A47J 31/047 99/279 |
| 2007/0295220 | A1 | * | 12/2007 | Webster ............. A47J 31/0668 99/290 |

(Continued)

OTHER PUBLICATIONS

Search Report & Written Opinion issued in App. No. PCT/US2014/029339 dated 2014.

*Primary Examiner* — Thien S Tran
(74) *Attorney, Agent, or Firm* — Barnes & Thornburg LLP

(57) ABSTRACT

The present disclosure relates to a funnel liquid shield and sensor for use in brewing funnels of a beverage making apparatus. The liquid shield is moveably attached to the funnel. The sensor detects at least one of a presence and absence of liquid in the funnel and is used to provide a signal to at least one of lock or unlock the funnel from the beverage making apparatus or provide a signal corresponding to the condition of liquid in the funnel.

16 Claims, 5 Drawing Sheets

(56) References Cited

U.S. PATENT DOCUMENTS

2009/0117239 A1* 5/2009 Bunn .................. A47J 31/0689
　　　　　　　　　　　　　　　　　　　　　426/433

* cited by examiner

BREWING FUNNEL SHIELD AND SENSOR

CROSS REFERENCE TO RELATED APPLICATIONS

This application is a U.S. nationalization under 35 U.S.C. §371 of International Application No. PCT/US2014/029339, filed Mar. 14, 2014, which claims the benefit of priority under 35 U.S.C. §119(e) to U.S. Provisional Patent Application No. 61/787,466, filed Mar. 15, 2013. The disclosures set forth in the referenced applications are incorporated herein by reference in their its entirety.

BACKGROUND

The present disclosure relates to a funnel liquid shield and sensor for use in brewing funnels of a beverage making apparatus. The liquid shield is moveably attached to the funnel. The sensor detects at least one of a presence and absence of liquid in the funnel and is used to provide a signal to at least one of lock or unlock the funnel from the beverage making apparatus or provide a signal corresponding to the condition of liquid in the funnel.

A variety of brewing funnels are available which are used to support filter papers or reusable/permanent filters containing a beverage brewing substance, such as tea or ground coffee. Typically, a brewing funnel is attached to a brewing apparatus such that heated water can be sprayed over the brewing substance to infuse the substance and produce a liquid brewed beverage. The bottom of the funnel is configured with an aperture to allow the brewed beverage to drain from the bottom of the funnel into a carafe or pot positioned therebelow.

Brewing funnels normally should remain in the brewing apparatus throughout the brewing cycle until the entire volume of brewed beverage has drained therefrom. However, in a traditional brewing apparatus, it is possible for a user to remove the brewing funnel from the brewing apparatus prior to complete draining of the brewed beverage from the brewing funnel. When this occurs, a slurry of the heated water, brewing substance and/or brewed beverage retained in the funnel may slosh out of the funnel when it is removed. Commonly, brewing funnels have a handle which is held by the user's hand when putting the brewing funnel into or removing it from the brewing apparatus. If a user does not act with caution when removing the brewing funnel, the slurry of heated water, brewing substance and/or brewed beverage may slosh onto the user's hand.

An object of the present invention is to provide a liquid shield for use with a brewing funnel to prevent unintentional escape of brewing substance and water from the funnel.

Another object of the present invention is to provide a funnel including a liquid shield to prevent unintentional escape of brewing substance and water from the funnel.

A further object of the present invention is to provide structure for easily moving a liquid shield of a brewing funnel out of a mouth of the associated brewing funnel, and thereby out of a flow path of a filter and brewing substance inside the brewing funnel, for cleaning or for when the funnel is inverted for disposal of the filter and spent grounds.

A further object of the present invention is to position a liquid shield on a brewing funnel so that it does not interfere with the placement of the brewing funnel in the brewing apparatus when the liquid shield is located within the circumference of the brewing funnel.

Another object of the present invention is to configure the liquid shield to interfere with the placement of the brewing funnel in the brewing apparatus when the liquid shield has been displaced from the brewing funnel.

Another object of the present invention is to provide a brewing funnel lock that prohibits movement of the brewing funnel until a sensor of the brewing apparatus detects substantially all of the liquid in the brewing funnel has drained out of the funnel.

Another object of the present invention is to position a sensor to electronically detect whether liquid in the brewing funnel has been emptied or drained from the funnel and to notify the user whether the funnel has been emptied based on the detection by the sensor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
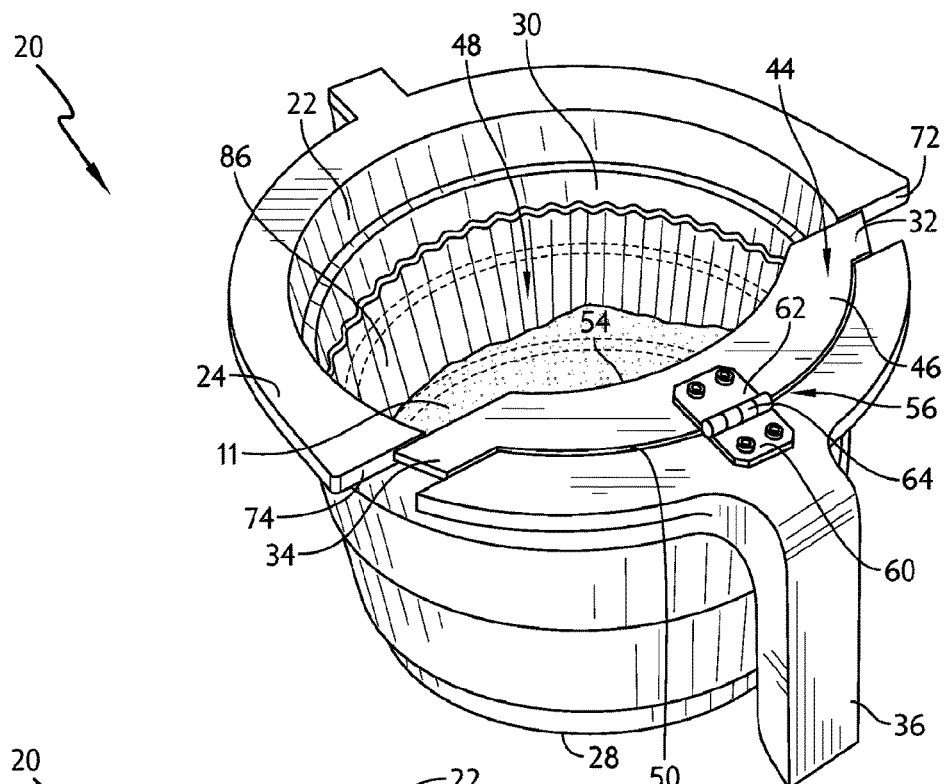
FIG. 1 is a perspective view of a brewing funnel having a liquid shield retained therein.
Figure 3:
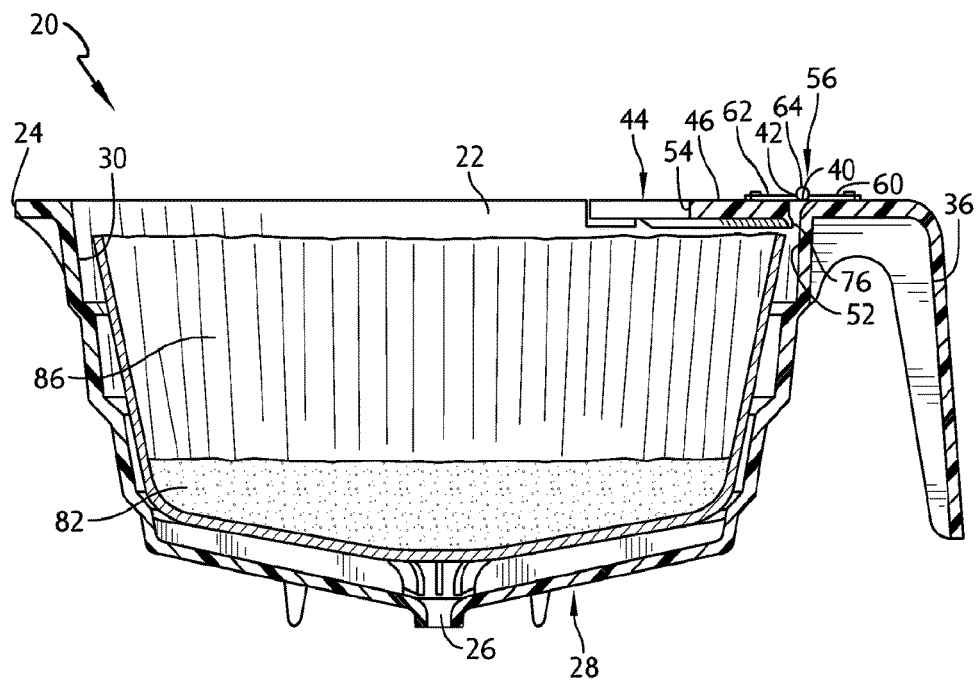
FIG. 3 is cross-sectional view taken along the line 3-3 in FIG. 1 showing the liquid shield engaged with the brewing funnel.
Figure 8:
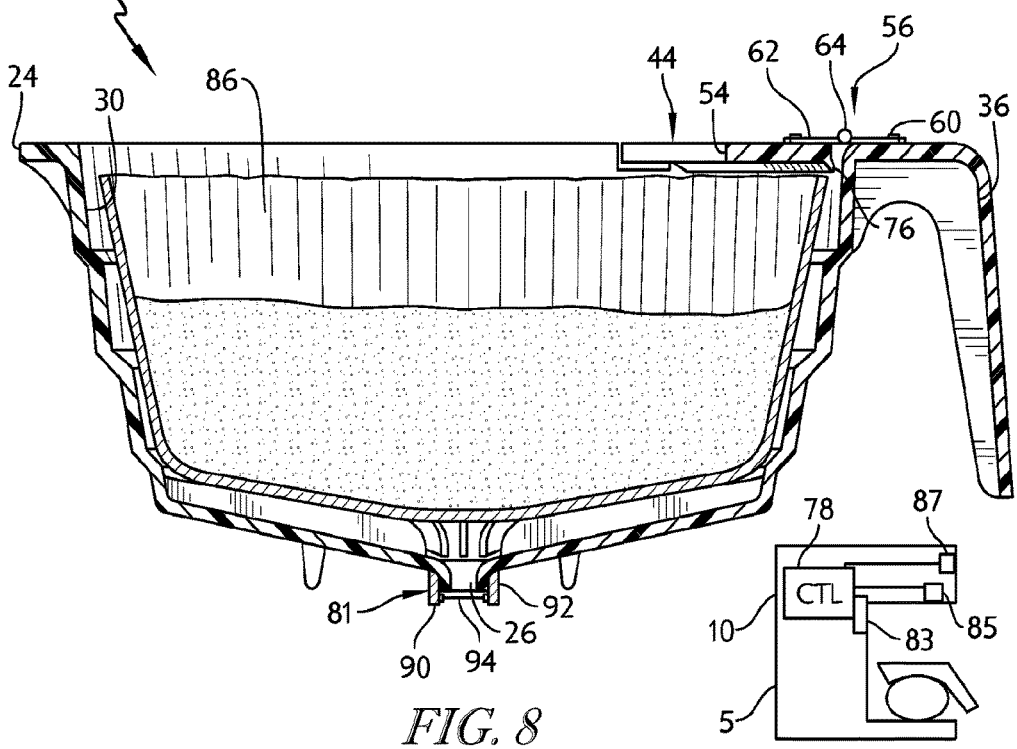
FIG. 8 is a cross-sectional view of a brewing funnel having a sensor to monitor liquid flow out of an aperture in the bottom of the brewing funnel.

As seen in FIG. 1, a beverage funnel 20 for use with a beverage making apparatus 10 such as a beverage brewer (see FIG. 8). The funnel 20 as shown has a generally frustroconical shape body with a mouth 22 which is defined in part by an annular lip, flange, or rim 24 for attachment to the beverage brewer in order to receive the water dispensed by the brewer for mixing with the beverage brewing substance 11 retained within a filter 86 retained within the funnel 20. The attachment of a funnel by such a flange is well known in the art. As illustrated in FIG. 3, a drain aperture 26 is formed in the bottom surface 28 of the beverage funnel 20. A side wall 30 generally extends continuously around the beverage funnel 20 between the annular lip 24 and the bottom surface 28. While a generally frustroconical funnel shape having a circular cross-section is shown in FIG. 1, other forms of the funnel 20 may be provided such as a generally rectangular or square cross-sectional shape, triangular cross-sectional shape or oval cross-sectional shape. A grip or handle 36 is provided on an outside surface 38 of the side wall 30. The handle 36 could be any form of a gripping structure defined on the funnel 20 to facilitate gripping, grasping or otherwise handling the funnel 20.

Figure 2:
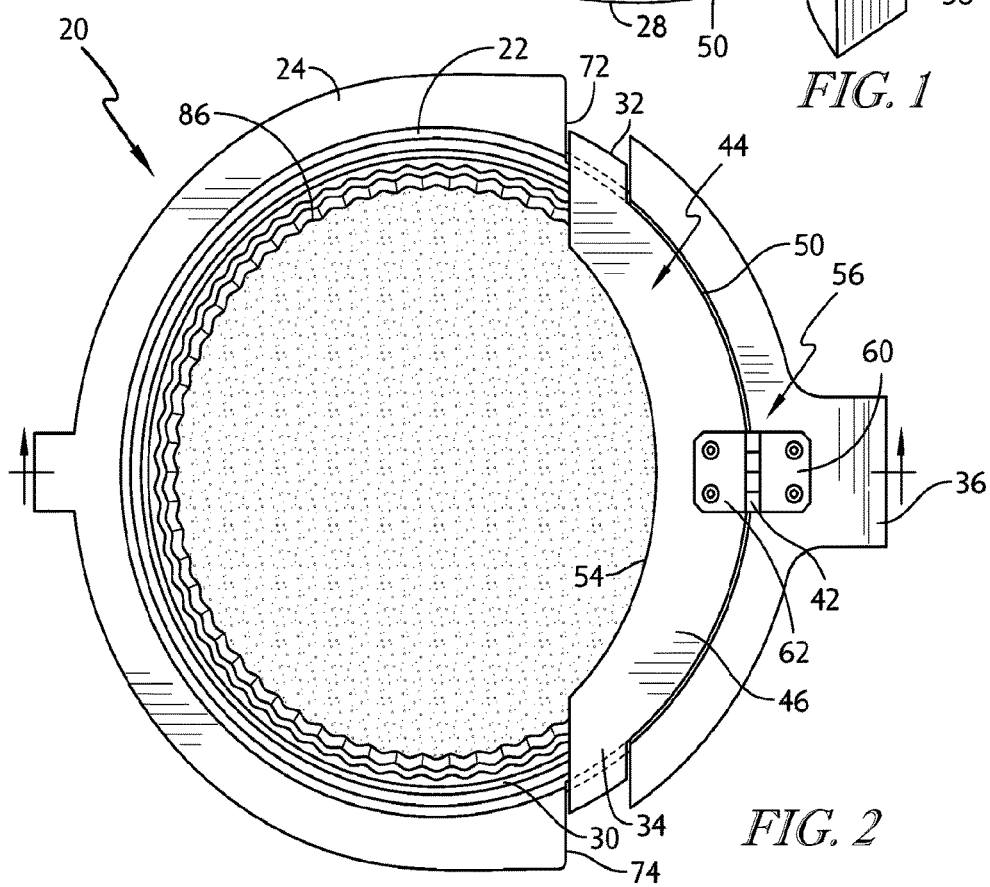
FIG. 2 is a top plan view of the brewing funnel of FIG. 1.

A liquid shield 44 is attached to the funnel 20 generally adjacent the handle 36, as illustrated in FIGS. 1 and 2. The liquid shield 44 is similar to the devices as shown in U.S. Pat. No. 6,055,900, U.S. Pat. No. 6,487,961, and U.S. Pat. No. 6,497,818, which are assigned to Bunn-O-Matic Corporation, the assignee of the present invention and which patents are incorporated herein in the entirety by reference. The present invention enhances the utility of the liquid shield 44.

The liquid shield 44 is formed of material that is resistant to moisture and heat, such as the material from which the brewing funnel 20 is formed or any other suitable material. The liquid shield 44 includes a body portion 46 which is position proximate to the cavity and in at least one embodiment extends inwardly over at least a portion of a cavity 48 defined by at least the wall 30 and mouth 22. The funnel 20 includes a bottom 28 and in at least one embodiment, the drain aperture 26 extends through the bottom 28. When the liquid shield 44 is in an engaged position with the funnel 20, as illustrated in FIGS. 1 and 2, the liquid shield 44 is located inside the circumference or mouth of the funnel 20. The body portion 46 of the liquid shield 44 includes a first edge 50, generally proximate to the brewing funnel 20 and in particular an inside surface 52 of the side wall 30. A second edge 54 is positioned generally opposite the first edge 50 extending over the cavity 48 when the liquid shield 44 is in the engaged position.

Figure 5:
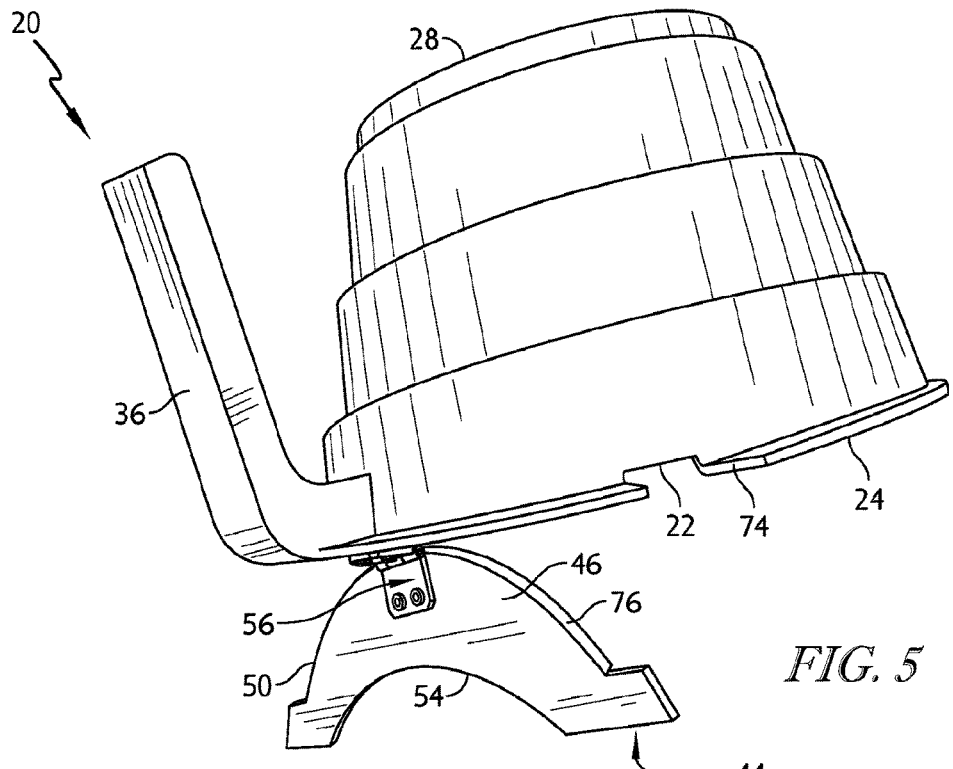
FIG. 5 is a perspective view of the brewing funnel of FIG. 1 showing the funnel has been inverted to dispose of the filter and brewing substance and showing the liquid shield has been displaced out of engagement with the brewing funnel, the liquid shield moving about a hinge coupled to the brewing funnel.

The liquid shield 44 is attached to the funnel 20 by a hinge assembly 56. In an illustrative embodiment and as illustrated in FIGS. 1, 2 and 5, the hinge assembly 56 includes a funnel portion or wing 60, a shield portion or wing 62, with a pivot mechanism or movable joint 64 therebetween that allows the shield wing 62 to pivot with respect to the funnel wing 60. The pivot mechanism 64 may include a pin 40 and a knuckle 42 that can rotate with respect to each other to allow the shield wing 62 and the funnel wing 60 to rotate with respect to each other. The funnel wing 60 may be coupled to the annular lip 24, the handle 36, or any other suitable portion of the funnel 20. The shield wing 62 may be coupled to the body portion 46 or any other suitable portion of the liquid shield 44. In illustrative embodiments, the hinge assembly 56 may be coupled to the liquid shield 44 adjacent to the first edge 50. As the liquid shield 44 is not coupled to any other component of the funnel 20, the pin 40 and the knuckle 42 permit the shield wing 62, and therefore the liquid shield 44, to freely rotate with respect to the brewing funnel 20.

Figure 6:
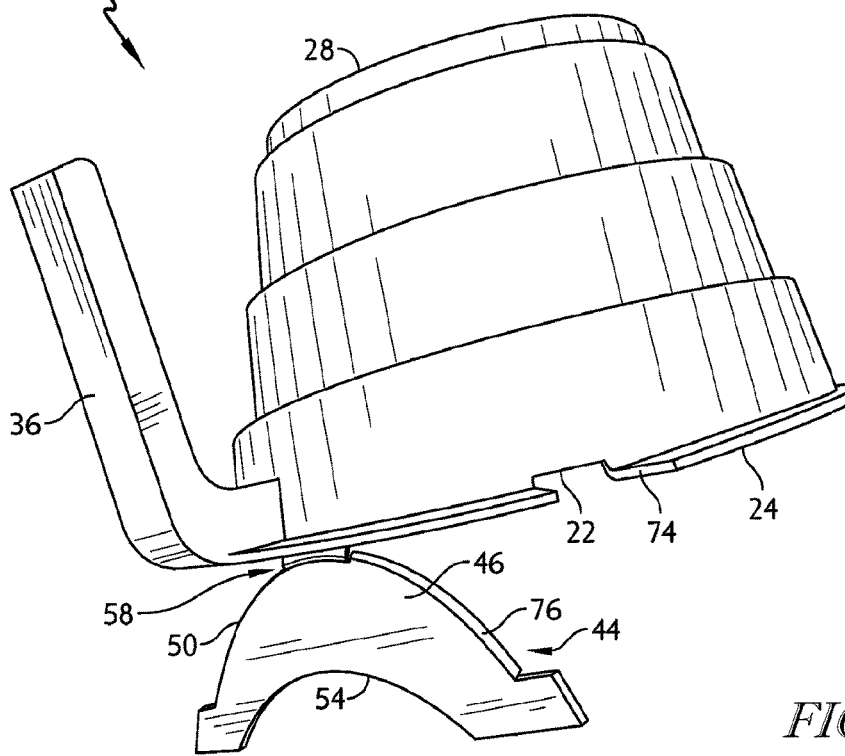
FIG. 6 is a view similar to FIG. 5 but showing the liquid shield may be attached to the brewing funnel by a living hinge connect to the shield and the funnel.
Figure 7:
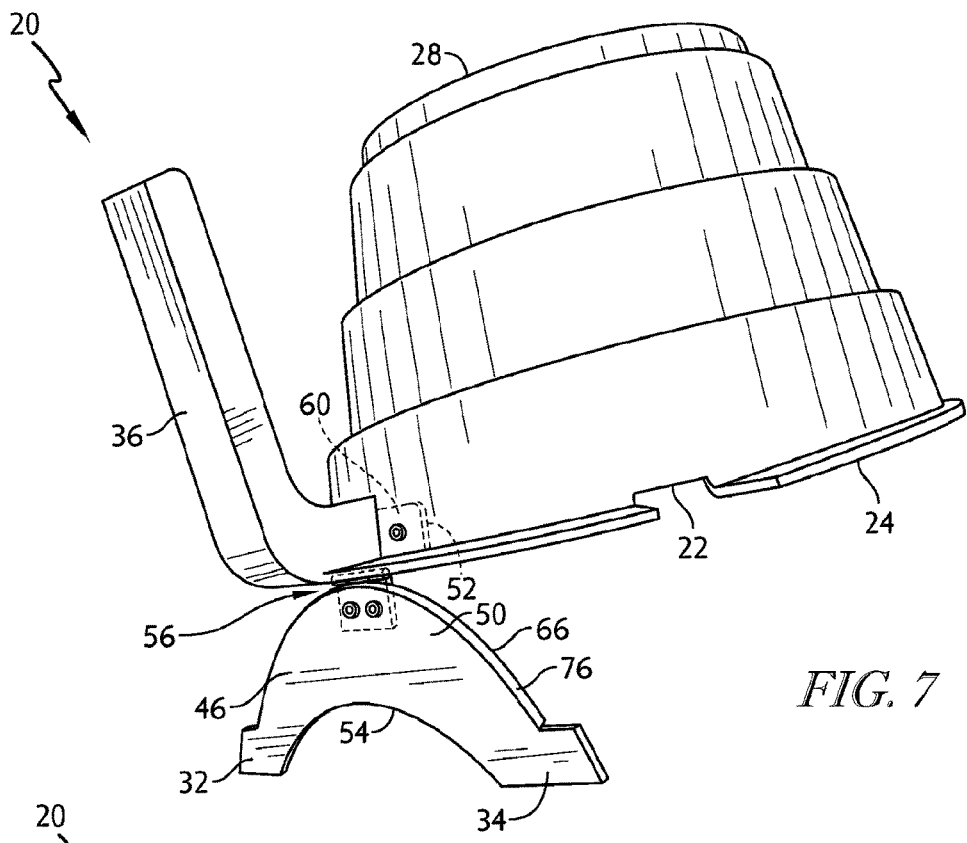
FIG. 7 is a view similar to FIG. 5 but showing the liquid shield may be attached to the brewing funnel by an undermount hinge.

The hinge assembly 56 may be configured in any known method for creating a hinge joint between two components. For example, the shield wing 62 may be coupled to a bottom surface 66 of the liquid shield 44, and the funnel wing 60 may be coupled to the inside surface 52 of the side wall 30 of the brewing funnel 20, as illustrated in FIG. 7. In another illustrative embodiment, the hinge assembly 56 may be configured as a living hinge 58, as illustrated in FIG. 6. The living hinge 58 may be created by co-molding the liquid shield 44 and the brewing funnel 20 together form one unitary piece of plastic. In other illustrative embodiments, a portion of the plastic at the intersection of the liquid shield 44 and the brewing funnel 20 can be thinned to facilitate the creation of the living hinge 58. Other methods of creating a hinge are also contemplated under the present invention. For example, such a living hinge may be formed of a piece of generally unitary, flexible material having a same or different resilience and flexibility compared to the funnel material which could be formed of a more rigid plastics material. The specific embodiments disclosed herein are provided as a means of illustration and not limitation. It is envisioned that while all possible embodiments are not illustrated, one of ordinary skill in the art should be capable of producing the structures based on the teaching herein without undue experimentation.

Figure 4:
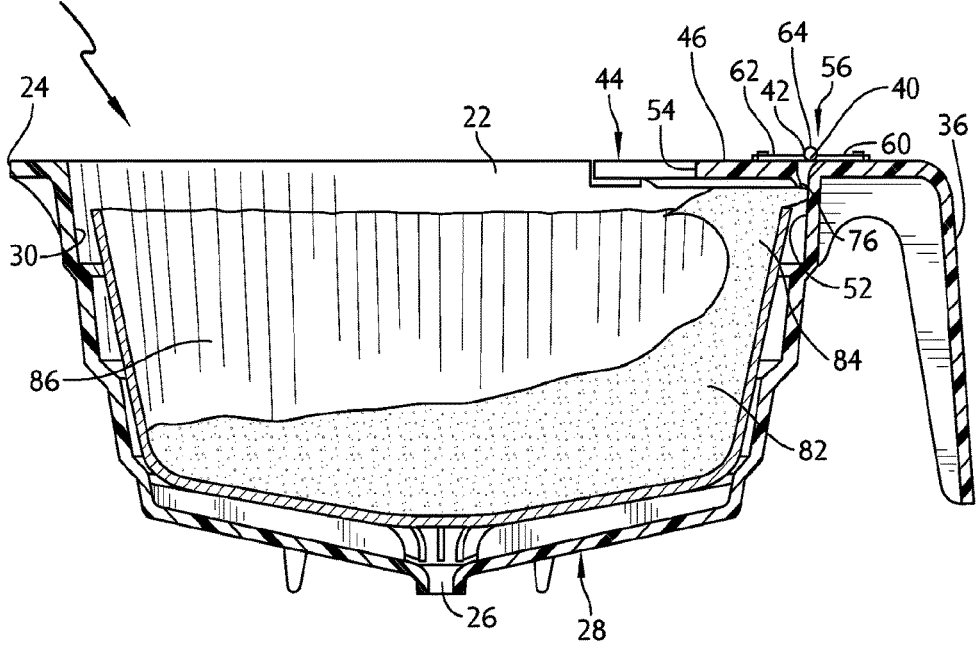
FIG. 4 is a cross-sectional view similar to FIG. 3 in which brewing substance and water are deflected back into the funnel by the liquid shield and prevented from sloshing out of the brewing funnel by the liquid shield.

As shown in FIGS. 3 and 4, the liquid shield 44 may include a flange 76 which extends from the first edge 50 down into the mouth 22. The flange 76 may be configured to abut against or engage with the annular lip 24 defining the mouth 22 or the side wall 30 to help at least generally close and alternatively seal the first edge 50 against irregularities in the side wall 30. The closure prevents or reduces liquid or beverage brewing substance from spilling out between the first edge 50 of the liquid shield 44 and the funnel 20 when the liquid shield 44 is engaged with the brewing funnel 20.

Generally, the liquid shield 44 is positioned near or below the mouth 22 proximate to the handle 36 when the liquid shield 44 is positioned relative to the funnel for blocking movement of the slurry of material in the funnel or in engagement with the funnel 20. In illustrative embodiments, the liquid shield 44 may include two extensions or tabs 32, 34 that extend away from the body portion 46. Two notches 72, 74 are provided in the side wall 30 of the brewing funnel 20, the two notches 72, 74 generally corresponding with the size and location of the tabs 32, 34 when the liquid shield 44 is engaged with the brewing funnel 20, as illustrated in FIG. 2. The tabs 32, 34 and their corresponding notches 72, 74, in which the tabs are received, align the liquid shield 44 with the funnel 20 and position it relative to the mouth 22 when the liquid shield 44 is engaged with the funnel 20. When the liquid shield 44 has pivoted about the hinge assembly 56 to be disengaged from the funnel 20, the body portion 46 and the tabs 32, 34 are configured to interfere with the brewing apparatus 10 to prevent insertion of the funnel 20 into the apparatus in an unintended manner.

While the design and placement of the liquid shield 44 relative to the brewing funnel 20 as show in the Figures is generally symmetric relative to the handle 36, it is envisioned that there may be other relationships between the handle 36 and the liquid shield 44. For example, if the geometry of the funnel 20 is different, the relationship movement of the liquid and beverage brewing substance in the funnel 20 may dictate placement of the liquid shield 44 in a different location relative to the handle 36. The specific embodiments disclosed herein are provided as a means of illustration and not limitation. It is envisioned that while all possible embodiments are not illustrated, one of ordinary skill in the art should be capable of producing the structures based on the teaching herein without undue experimentation.

As shown in FIG. 4, the liquid shield 44 prevents a material 82 in the brewing funnel 20, typically liquid and beverage brewing substance in a slurry, substantially from escaping the cavity 48 of the brewing funnel 20 when displaced in a generally horizontal direction of movement, such as when the funnel is slidably removed form the brewer 10. The liquid shield 44 significantly blocks passage or otherwise reduces or prevents escape of the material 82 in the area near the handle 36. Typically, the liquid shield 44 will generally at least reduce or possibly prevent, depending on the configuration of the components, escape of the material 82 should the funnel 20 be removed from the brewer prior to completion of the brewing process. If the funnel 20 is removed from the brewer while there is still material 82 therein, the material 82 may develop a greater degree of momentum 84 toward the handle 36. The liquid shield 44 causes the material 82 to be redirected and/or deflected back into the cavity 48.

During a brewing operation, the funnel 20 is situated within a brewing apparatus 10 with the handle 36 in a position such that the funnel 20 can be removed from the brewing apparatus 10 by gripping the handle 36 when the brewing process is complete. A filter 86 is positioned in the cavity 48 with a brewing substance placed therein. During the brewing process, water is sprayed through the mouth 22 and into the cavity 48 for mixing with the brewing substance. One of ordinary skill in the art will appreciate the method of brewing as described herein above. The water and brewing substance begin the process of infusion whereby the water and the brewing substance are mixed together to form the material 82 from which a brewed beverage is extracted and drained through the filter 86 and out of the funnel through the drain aperture 26.

The filter 86 may be in the form of a paper filter which is disposable or a permanent filter which is reusable. In either embodiment of filter, the use of a shield 44 may be useful in order to be displaceable from the funnel and permit removal of the filter and wet but drained brewing substance and/or slurry from the funnel. The liquid shield 44 is sized and dimensioned so as to not interfere with the operation of a spray head (not shown) to dispense water into the cavity 48 and over the brewing substance during the brewing process but to prevent unintended escape of material 82 from the funnel 20.

In use, the funnel 20 is provided for receiving the liquid shield 44 therein and/or thereon. In one embodiment, the liquid shield 44 is positioned to be engaging with the funnel 20 when the tabs 32, 34 are inserted into the corresponding notches 72, 74. In this arrangement, first edge 50 and flange 76 may engage with side wall 30 of brewing funnel 20 and liquid shield 44 may be located below mouth 22. The shape of the liquid shield 44 and the location of the liquid shield 44 near the mouth 22 helps allow the funnel 20 to accept a standard filter 86 and does not require a custom-sized filter for operation of the brewing apparatus 10. Additionally, while the shield is shown herein in combination with the notches 72, 74 and tabs 32, 34, additional embodiments of the shield 44 which do not include tabs may be configured based on the teachings provided herein.

Disclosed herein is a shield 44 which is displaceable relative to a funnel 20 but is also retained on the funnel. The hinge 56, regardless of its several forms disclosed herein or taught hereby, provides a connection between the shield 44 and the funnel 20 to prevent loss or displacement of the shield 44 from the funnel assembly. The shield being connected to the funnel but displaceable therefrom also facilitates ease of inserting or removing a filter and beverage brewing substance. While movement of the shield 44 relative to the funnel 20 is less significant when inserting the filter and brewing substance is useful when disposing of the used filter and spent grounds at the end of the brewing process.

Figure 9:
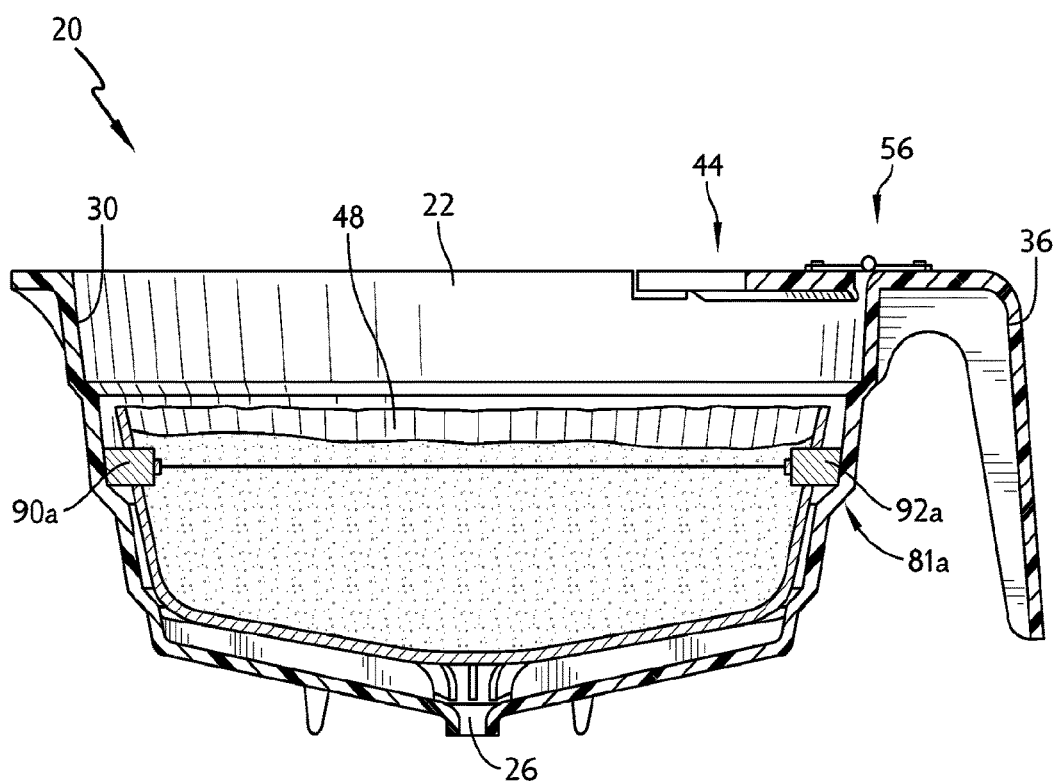
FIG. 9 is a cross-sectional view of a brewing funnel having a sensor to monitor the amount of liquid left, the presence or absence of liquid, in the brewing funnel.

The brewing apparatus 10, shown diagrammatically in a significantly reduced size for illustration purposes only, in FIGS. 8 and 9 may also include an electronic device or controller 78 coupled to a sensor 81 to monitor the liquid level in the funnel or at least one of a presence or absence of at least an appreciable volume of liquid in the funnel. In one embodiment, the sensor 81 is coupled to the funnel 20 to monitor the flow, presence, absence or other characteristics of liquid flowing through the drain aperture 26. The sensor can be coupled to the controller 78 using a wired or wireless detector 83 carried on the brewer 10 and coupled, wired or wirelessly, to the controller 78 to detect the characteristics associated with the sensor 81 monitoring. By monitoring the presence, absence or other characteristics of the liquid in the funnel 20, the brewing apparatus 10 may be able to provide a user with an indication of whether there is still liquid or material 82 inside the funnel 20 before a user removes the funnel 20 from the brewing apparatus 10. Such monitoring would allow a user to determine when the funnel 20 is empty or drained and that the funnel 20 may be removed to reduce the possibility of the liquid or material 82 sloshing onto a user.

Additionally, the controller 78 can be coupled to a funnel locking system 85 which blocks or otherwise prohibits removal of the funnel unless a predetermined condition is satisfied. In this regard, the controller 78 can indicate to the funnel locking system 85 that the funnel should remain locked in engagement with the brewer 10 until a predetermined condition relating to the presence, absence or other characteristic associated with liquid flowing through the drain 26 is achieved. Once the sensor 81 provides a signal that is within a predetermined range of characteristics, the funnel locking system will unlock the funnel and allow for removal of the funnel from the brewer 10. Notification to the user can also be achieved using an indicator 87 which proved a perceptible condition to the user such as a light, sound or other signal.

In one embodiment as shown in FIG. 8, the sensor 81 may include a level sensor 88 placed around the drain providing a beam path 89 or the sensing configuration to detect steam, heat, optical characteristics in addition to other, extending between portions of the sensor 88. The portions may include an emitter 90 and a receiver 92 that are generally aligned or otherwise coupled to each other. The laser emitter 90 emits a beam 94 that is received by the receiver 92, the beam 94 being transmitted across the circumference of the drain aperture 26 of the funnel 20. When the brewing apparatus 10 is operating and the beam 94 is in an interrupted state such that it is not received by the laser receiver 92, the controller 78 detects a signal which indicates that the funnel 20 is not empty and has liquid flowing from it. When the beam 94 goes from an interrupted state to an uninterrupted state where the receiver 92 receives the beam 94, the controller 78 can detect a signal which indicates the funnel 20 is in a condition in which the flow of liquid has at least generally ceased and is within a range of parameters where it is permissible to unlock the funnel lock system of the brewing apparatus and allow the funnel be removed therefrom.

An alternative embodiment is illustrated in FIG. 9, in which the sensor 81 may be positioned inside the funnel 20 to monitor the level of liquid or material 82 within the funnel 20. Similar to the system of FIG. 8, a transmitter 90a provides a beam or signal 94 (optical, light, acoustic, conductive, inductive, etc.) across a path to the receiver 92a spaced apart from the transmitter on the another side of the funnel. The sensor 81 may be positioned at a variety of vertical positions in the funnel 20. When the signal 94 is in an uninterrupted or an interrupted state (depending on the type of signal), the controller can indicate the funnel 20 is empty and/or unlock the funnel lock of the brewing apparatus 10. Any signal system currently know or hereafter developed to monitor the relevant characteristics of the liquid in the funnel 20 is envisioned and encompassed in the present invention, and the present invention should not be limited to the embodiments expressly described herein.

The foregoing terms as well as other terms should be broadly interpreted throughout this application to include all known as well as all hereafter discovered versions, equivalents, variations and other forms of the abovementioned terms as well as other terms.

The present disclosure is intended to be broadly interpreted and not limited. While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A beverage funnel for use with a beverage making apparatus, the funnel including at least one wall having an annular rim defining a mouth at a top of the wall, at least one aperture in a bottom portion of the wall for draining liquid there from, and a cavity generally defined by the wall and mouth;
   a liquid shield being positioned at least proximate to the annular rim and moveably retained on a portion of the funnel to facilitate selective positioning and displacement of the shield relative to the cavity from an engaged position during beverage brewing wherein the liquid shield covers only a portion of the cavity to a second position wherein the liquid shield remains connected to the funnel and is moved to uncover the cavity thereby facilitating inserting of a filter into the funnel and removal of a filter from the funnel.

2. The funnel as set forth in claim 1 further comprising a hinge assembly moveably connecting the shield to the funnel.

3. The funnel as set forth in claim 2, the hinge assembly including a funnel portion and a shield portion, each portion attached to a respective portion of the funnel, the funnel portion and shield portion of the hinge having a moveable joint there between for permitting movement of the shield relative to the funnel.

4. The funnel as set forth in claim 2 in which the hinge assembly includes a flexible component formed of generally integral material connecting the shield to the funnel.

5. The funnel as set forth in claim 4 wherein the hinge assembly component is a living hinge which is co-molded with the shield and the funnel to provide hinged movement of the shield relative to the funnel.

6. The funnel as set forth in claim 4 wherein the hinge assembly includes a flexible piece of material which is attached to the shield and the funnel to provide a living hinge assembly.

7. A beverage funnel for use with a beverage making apparatus, the funnel including a least one wall defining a mouth, and a cavity defined by the wall and mouth, the funnel comprising means for generally horizontal movement for removal of the funnel from the beverage making apparatus and for generally horizontal movement for insertion of the funnel into the beverage making apparatus;
   a liquid shield being positioned at least proximate to the cavity being moveably retained on a portion of the funnel to facilitate selective positioning and displacement of the shield relative to the cavity between an engaged position wherein the liquid shield and funnel are in a brewing position in the beverage making apparatus with the liquid shield overlying a portion of the cavity and a second position wherein the liquid shield and funnel are removed from the beverage making apparatus and the liquid shield is coupled to the funnel and does not overly the cavity;
   a device detecting at least the presence of liquid in the funnel or absence of liquid in the funnel; and
   a device to prevent removal of the funnel from the beverage making apparatus upon detecting of a predetermined condition.

8. A beverage making apparatus including a funnel for use in making a beverage, the funnel including a least one wall defining a mouth, at least one aperture in the wall for draining liquid there from, and a cavity defined generally by the wall and mouth;
   a device for detecting at least the presence of a volume of liquid in the funnel or absence of a volume liquid in the funnel; and
   a device for preventing removal of the funnel from the beverage making apparatus upon detecting a volume of liquid in the funnel.

9. The funnel as set forth in claim 1 wherein the liquid shield in the engaged position covers no more than half of the annular rim of the funnel.

10. A beverage making apparatus comprising,
    a funnel adapted for generally horizontal movement for removal of the funnel from the beverage making apparatus, the funnel including at least one wall defining a cavity having a circumferential mouth, the funnel defining a space for a filter for holding a brew substance, at least one aperture in the wall for draining liquid there from,
    a liquid shield being positioned proximate the circumferential mouth of the cavity and moveably retained on a portion of the funnel to facilitate selective positioning and displacement of the shield relative to the cavity between a first engaged position overlying a portion of the cavity and a second position uncovering the portion of the cavity while the liquid shield remains coupled to the funnel, the liquid shield in the engaged position extending over no more than half the entire cavity during brewing,
    whereby liquid in the cavity is inhibited from sloshing past the liquid shield and out of the cavity upon removal of the funnel from the beverage making apparatus.

11. The beverage making apparatus as set forth in claim 10 further comprising
    a sensor monitoring liquid level in the funnel, and
    means for receiving a signal from the sensor and for locking the funnel to prevent removal of the funnel from the beverage making apparatus.

12. The beverage making apparatus as set forth in claim 10 further comprising a hinge assembly attached to the liquid shield and attached to the funnel to provide for moving the liquid shield between the first engaged position and the second position.

13. The beverage making apparatus as set forth in claim 10 further comprising at least one notch and one tab for aligning the liquid shield with respect to the mouth in the engaged position.

14. The beverage making apparatus as set forth in claim 10 wherein movement of the liquid shield from the engaged position to the second position facilitates inserting of the filter into the funnel and removal of the filter from the funnel.

15. A beverage funnel for use with a beverage making apparatus, the funnel including at least one wall having an annular rim defining a mouth at a first end of the wall, at least one aperture in a second end of the wall opposite said first end for draining liquid there from, and a cavity generally defined by the wall and mouth;

a liquid shield being positioned at least proximate to the annular rim and moveably retained on a portion of the funnel to facilitate selective positioning and displacement of the shield relative to the cavity from an engaged position during beverage brewing wherein the liquid shield covers only a portion of the annular rim to a second position wherein the liquid shield remains connected to the funnel and is moved to uncover the cavity thereby facilitating inserting of a filter into the funnel and removal of a filter from the funnel.

16. The beverage making apparatus as set forth in claim 15 further comprising a handle coupled to the funnel for facilitating generally horizontal movement for removal of the funnel from the beverage making apparatus and for generally horizontal movement for insertion of the funnel into the beverage making apparatus.

* * * * *